United States Patent
Shin et al.

(10) Patent No.: US 8,744,361 B2
(45) Date of Patent: Jun. 3, 2014

(54) DEVICES AND METHODS FOR TRANSMITTING AND RECEIVING DATA USING PRECODING MATRIX

(75) Inventors: Won-Jae Shin, Yongin-si (KR); Nam Yoon Lee, Seoul (KR); Yung Soo Kim, Seongnam-si (KR); Young Jun Hong, Seoul (KR); Eun Yong Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 993 days.

(21) Appl. No.: 12/769,831

(22) Filed: Apr. 29, 2010

(65) Prior Publication Data

US 2011/0045782 A1   Feb. 24, 2011

(30) Foreign Application Priority Data

Aug. 18, 2009   (KR) .................. 10-2009-0076063

(51) Int. Cl.
  *H04B 1/00*  (2006.01)
  *H04B 15/00*  (2006.01)
(52) U.S. Cl.
  USPC ........................................... 455/63.1
(58) Field of Classification Search
  USPC .............. 455/63.1, 67.11, 501, 296, 278.1; 370/203
  See application file for complete search history.

(56) References Cited

U.S. PATENT DOCUMENTS

| | | | |
|---|---|---|---|
| 7,970,064 B2 * | 6/2011 | Fung et al. | 375/260 |
| 8,238,954 B2 * | 8/2012 | Liu et al. | 455/501 |
| 2009/0046569 A1 | 2/2009 | Chen et al. | |
| 2009/0046570 A1 | 2/2009 | Sarkar et al. | |

FOREIGN PATENT DOCUMENTS

| KR | 10-2008-0066628 | 7/2008 |
|---|---|---|
| KR | 10-2009-0008037 | 1/2009 |
| KR | 10-2009-0023879 | 3/2009 |

OTHER PUBLICATIONS

3GPP TR 36.814 Release 9 103 V9.0.0 (Mar. 2010), "Further Advancements for E-UTRA Physical Layer Aspects," Release 9. 3GPP Organizational Partners (ARIB, ATIS, CCSA, ETSI, TTA, TTC), 2010, pp. 1-104.

\* cited by examiner

*Primary Examiner* — Eugene Yun
(74) *Attorney, Agent, or Firm* — NSIP Law

(57) ABSTRACT

A communication system to feed back an index of a precoding matrix is provided. A terminal may feed back an index of an optimal precoding matrix based on estimated channel status. A base station may transmit data to the terminal based on the index of the precoding matrix received from the terminal.

16 Claims, 9 Drawing Sheets

DEVICES AND METHODS FOR TRANSMITTING AND RECEIVING DATA USING PRECODING MATRIX

CROSS-REFERENCE TO RELATED APPLICATION(S)

This application claims the benefit under 35 U.S.C. §119(a) of Korean Patent Application No. 10-2009-0076063, filed on Aug. 18, 2009, in the Korean Intellectual Property Office, the entire disclosure of which is incorporated herein by reference for all purposes.

BACKGROUND

1. Field

The following description relates to a method of transmitting and receiving data using a precoding matrix.

2. Description of Related Art

Recently, technology using a plurality of transmit antennas to transmit data in a mobile communication system has been in development. For example, multiple-input and multiple-output (MIMO) technology has attracted attention because it offers an increase in data throughput and link range without the need for additional bandwidth or transmission power. A status of a channel between a base station transmitting data and a terminal receiving the data, and vice versa, may need to be estimated to effectively use the plurality of transmit antennas.

A terminal may estimate a status of a channel between the terminal and a base station. The terminal may select an index of a precoding matrix based on the estimated status of the channel, and transmit the index of the precoding matrix to the base station. The base station may determine, as a precoding vector, a vector corresponding to the index of the precoding matrix, and may precode data and transmit the precoded data to the terminal.

In the example where the terminal receives signals from a plurality of base stations, signals transmitted from interference base stations may function as interference signals. Each of the interference base stations may need to be accurately aware of a channel status between each of the interference base stations and the terminal to minimize the effect of interference signals.

For this example, a terminal may estimate a status of a channel between the terminal and an interference base station, and transmit, to the interference base station, an interference index of a precoding matrix that is selected based on the estimated status of the channel.

However, where a plurality of interference base stations exists, an amount of channel status and interference information may increase, because a common interference index does not exist with respect to the plurality of interference base stations. Thus, performance of the terminal and the base stations may be deteriorated.

SUMMARY

In a first general aspect, there is provided a terminal including a channel estimator to estimate the status of an interference channel between the terminal and an interference base station and to estimate the status of a serving channel between the terminal and a serving base station, a selector to select an index of a precoding matrix based on the status of the interference channel and the status of the serving channel, a transmitter to transmit the selected index of the precoding matrix to the serving base station, and a receiver to receive data from the serving base station based on the index of the precoding matrix.

The terminal may further include an autocorrelation matrix generator to generate an autocorrelation matrix of the interference channel based on the status of the interference channel, and a space divider to divide the autocorrelation matrix of the interference channel into a signal space and a null space, wherein the selector selects a precoding candidate vector from among vectors included in the null space, and the selector selects, as the index of the precoding matrix, an index of a vector that is most similar to the precoding candidate vector, from among vectors included in the precoding matrix.

The terminal may further include a singular value decomposition (SVD) unit to perform a SVD for the serving channel, wherein the selector selects, as the precoding candidate vector, a vector that is most similar to a right singular vector of the serving channel, from among the vectors included in the null space.

The terminal may further include a distance calculator to calculate a distance between the precoding candidate vector and each of the vectors included in the precoding vector, wherein the selector selects an index of a vector having the shortest distance from the precoding candidate vector, as the index of the precoding index.

In another general aspect, there is provided a base station including a receiver to receive, from a terminal, an index of a precoding matrix that is selected based on the status of a serving channel between the terminal and a serving base station and the status of an interference channel between the terminal and an interference base station, and a transmitter to transmit data to the terminal using a vector corresponding to the index of the precoding matrix, from among vectors included in the precoding matrix.

The index of the precoding matrix may correspond to an index of a vector that is most similar to a precoding candidate vector that is included in a null space of an autocorrelation matrix of the interference channel, from among the vectors included in the precoding matrix.

The precoding candidate vector may correspond to a vector that is most similar to a right singular vector of the autocorrelation matrix of the serving channel, from among the vectors included in the precoding matrix.

In another aspect, there is provided a terminal including a channel estimator to estimate the status of an interference channel between the terminal and an interference base station, a selector to select a first index of a precoding matrix based on the status of the interference channel, a transmitter to transmit the selected first index of the precoding matrix to a serving base station, and a receiver to receive, from the serving base station, a reference signal that is precoded based on the first index of the precoding matrix, wherein the channel estimator estimates the status of a serving channel between the terminal and the serving base station based on the reference signal, the selector selects a second index of the precoding matrix based on the status of the serving channel, the transmitter transmits the selected second index of the precoding matrix to the serving base station, and the receiver receives data that is precoded based on the first index and the second index of the precoding matrix.

The terminal may further include an autocorrelation matrix generator to generate an autocorrelation matrix of the interference channel based on the status of the interference channel, and a space divider to divide the autocorrelation matrix of the interference channel into a signal space and a null space, wherein the selector selects a first precoding candidate vector from vectors included in the null space, and the selector selects, as an index of the precoding matrix, an index of a vector that is most similar to the first precoding candidate vector, from among vectors included in the precoding matrix.

The terminal may further include a SVD unit to perform a SVD for the serving channel, wherein the selector selects, as a second precoding candidate vector, a vector that is most similar to a right singular vector of the serving channel, from among the vectors included in the null space of the interference channel, and the selector selects, as the second index of the precoding matrix, an index of a vector having a shortest distance from the second precoding candidate vector, from among the vectors included in the precoding matrix.

In another aspect, there is provided a base station including a receiver to receive, from a terminal, a first index of a precoding matrix that is selected based on the status of an interference channel between the terminal and an interference base station, a precoder to precode a reference signal based on the received first index of the precoding matrix, and a transmitter to transmit the precoded reference signal to the terminal, wherein the receiver receives a second index of the precoding matrix that is selected based on the reference signal, the precoder precodes data based on the first index and the second index of the precoding matrix, and the transmitter transmits the precoded data to the terminal.

The first index of the precoding matrix may correspond to an index of a vector that is most similar to a precoding candidate vector included in a null space of an autocorrelation matrix of the interference channel, from among vectors included in the precoding matrix.

The second index of the precoding matrix may be selected based on a SVD performed for a serving channel between the terminal and a serving base station.

In another aspect, there is provided a method of receiving data at a terminal, the method including estimating the status of an interference channel between a terminal and an interference base station and the status of a serving channel between the terminal and a serving base station, selecting an index of a precoding matrix based on the status of the interference channel and the status of the serving channel, transmitting the selected index of the precoding matrix to the serving base station, and receiving data from the serving base station based on the index of the precoding matrix.

The method may further include generating an autocorrelation matrix of the interference channel based on the status of the interference channel, dividing the autocorrelation matrix of the interference channel into a signal space and a null space, and selecting a precoding candidate vector from among vectors included in the null space, wherein the selecting of the index of the precoding matrix includes selecting an index of a vector that is most similar to the precoding candidate vector, from among vectors included in the precoding matrix.

The method may further include generating an autocorrelation matrix of the serving channel based on the status of the serving channel, and performing a SVD with respect to the serving channel, wherein the selecting of the precoding candidate vector includes selecting a vector that is most similar to a right singular vector of the serving channel, from among vectors included in the null space.

In another aspect, there is provided a method of receiving data at a terminal, the method including estimating a status of an interference channel between the terminal and an interference base station, selecting a first index of a precoding matrix based on the status of the interference channel, transmitting the selected first index of the precoding matrix to a serving base station, receiving, from the serving base station, a reference signal that is precoded based on the first index of the precoding matrix, estimating a status of a serving channel between the terminal and the serving base station based on the reference signal, selecting a second index of the precoding matrix based on the status of the serving channel, transmitting the selected second index of the precoding matrix to the serving base station, and receiving data that is precoded based on the first index and the second index of the precoding matrix.

The method may further include generating an autocorrelation matrix of the interference channel based on the status of the interference channel, dividing the autocorrelation matrix of the interference channel into a signal space and a null space, and selecting a first precoding candidate vector from among vectors included in the null space, wherein the selecting of the first index of the precoding matrix includes selecting an index of a vector that is most similar to the first precoding candidate vector, from among vectors included in the precoding matrix.

The method may further including generating an autocorrelation matrix of the serving channel based on the status of the serving channel, performing a SVD for the serving channel, and selecting, as a second precoding candidate vector, a vector that is most similar to a right singular vector of the serving channel, from among the vectors included in the null space, wherein the selecting of the second index of the precoding matrix includes selecting an index of a vector having a shortest distance from the second precoding candidate vector, from among the vectors included in the precoding matrix.

The method may further include calculating a distance between the second precoding candidate vector and each of the vectors included in the precoding matrix, wherein the selecting of the second index of the precoding matrix includes selecting the index of the vector having the shortest distance from the second precoding candidate vector, as the second index of the precoding matrix.

In another aspect, there is provided a computer-readable storage medium embodied with instructions for causing a processor to implement a method including estimating the status of an interference channel between a terminal and an interference base station and the status of a serving channel between the terminal and a serving base station, selecting an index of a precoding matrix based on the status of the interference channel and the status of the serving channel, transmitting the selected index of the precoding matrix to the serving base station, and receiving data from the serving base station based on the index of the precoding matrix.

Other features and aspects may be apparent from the following detailed description, the drawings, and the claims.

BRIEF DESCRIPTION OF THE DRAWINGS

Throughout the drawings and the description, unless otherwise described, the same drawing reference numerals are understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1:
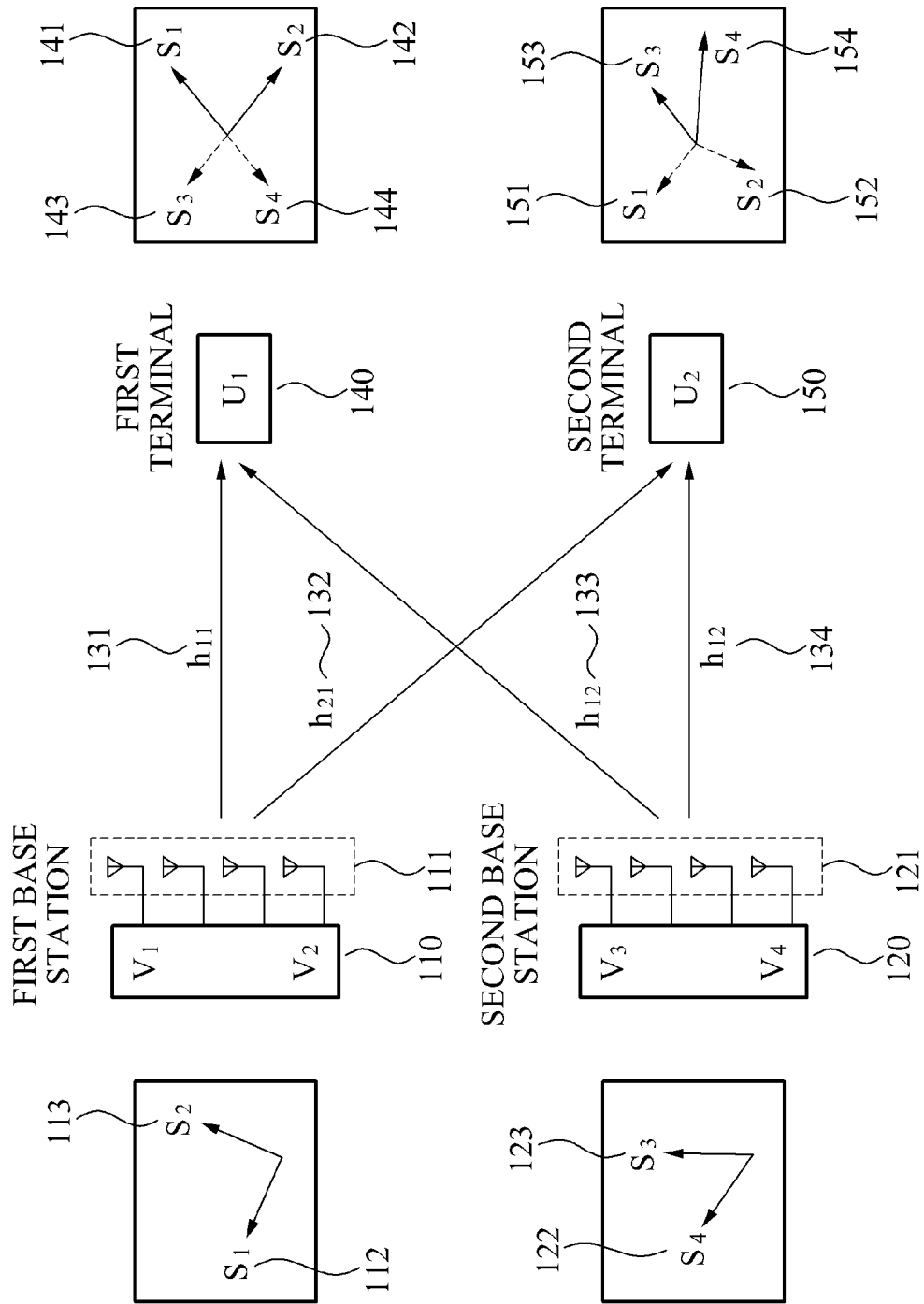
FIG. 1 is a diagram illustrating an example process of transmitting an index of a precoding matrix.

FIG. 1 illustrates an example process of transmitting an index of a precoding matrix.

In this example, a first base station 110 may transmit first data $S_1$ 112 and second data $S_2$ 113 to a first terminal 140 using a plurality of transmit antennas 111. The first data $S_1$ 112 and the second data $S_2$ 113 may be transmitted via a serving channel $h_{11}$ 131 between the first base station 110 and the first terminal 140. A second base station 120 may transmit third data $S_3$ 123 and fourth data $S_4$ 122 to a second terminal 150 using a plurality of transmit antennas 121. The third data $S_3$ 123 and the fourth data $S_4$ 122 may be transmitted via a serving channel $h_{12}$ 134 between the second base station 120 and the second terminal 150. The serving channel may include one or more wireless networks, for example, a wireless local area network (WLAN), a wireless broadband network (WiBro), a worldwide interoperability for microwave access (WIMAX) network, and the like.

The first data $S_1$ 112 and the second data $S_2$ 113 transmitted from the first base station 110 may be transmitted to the second terminal 150 via an interference channel $h_{21}$ 132. The first data $S_1$ 112 and the second data $S_2$ 113 may create interference and thus deteriorate the data reception performance of the second terminal 150. For example, the first data $S_1$ 112 and the second data $S_2$ 113 may interrupt and/or prevent data from being received by the second terminal 150.

Similarly, the third data $S_3$ 123 and the fourth data $S_4$ 122 transmitted from the second base station 120 may be transmitted to the first terminal 140 via an interference channel $h_{12}$ 133. The third data $S_3$ 123 and the fourth data $S_4$ 122 may create interference and thus deteriorate the data reception performance of the first terminal 140. For example, the third data $S_3$ 123 and the fourth data $S_4$ 122 may interrupt and/or prevent data from being received by the first terminal 140.

To reduce or prevent the effect of interference signals against the first terminal 140 and the second terminal 150, the first base station 110 and the second base station 150 may decrease the transmit power when transmitting data via the interference channels $h_{21}$ 132 and $h_{12}$ 133. For example, the first base station 110 and the second base station 150 may decrease a transmit power of transmission data by multiplying the transmission data by a precoding vector.

For example, an optimal precoding vector may be determined based on a status of an interference channel and a status of a serving channel. A terminal may estimate a channel status and select an index of a precoding matrix based on the estimated channel status. The terminal may select a precoding vector from among a plurality of vectors included in the precoding matrix. In this example, the terminal may determine, as an index of the precoding vector, an index of a vector having a best performance. The terminal may feed back the index of the precoding matrix to a base station. The base station may determine the precoding vector based on the received index of the precoding matrix.

To reduce the effect of interference signals, the second base station 120 may determine a precoding vector to reduce the magnitude of the transmission signals of the third data $S_3$ 143 and the fourth data $S_4$ 144 transmitted to the first terminal 140. The first base station 110 may determine the precoding vector to reduce the magnitude of the transmission signals of the first data $S_1$ 151 and the second data $S_2$ 152 transmitted to the second terminal 150.

The first base station 110 may determine the precoding vector that increases the magnitude of the transmission signals of the first data $S_1$ 141 and the second data $S_2$ 142 transmitted to the first terminal 140. The second base station 120 may determine the precoding vector that increases the magnitude of the transmission signals of the third data $S_3$ 153 and the fourth data $S_4$ 154 transmitted to the second terminal 150.

Figure 2:
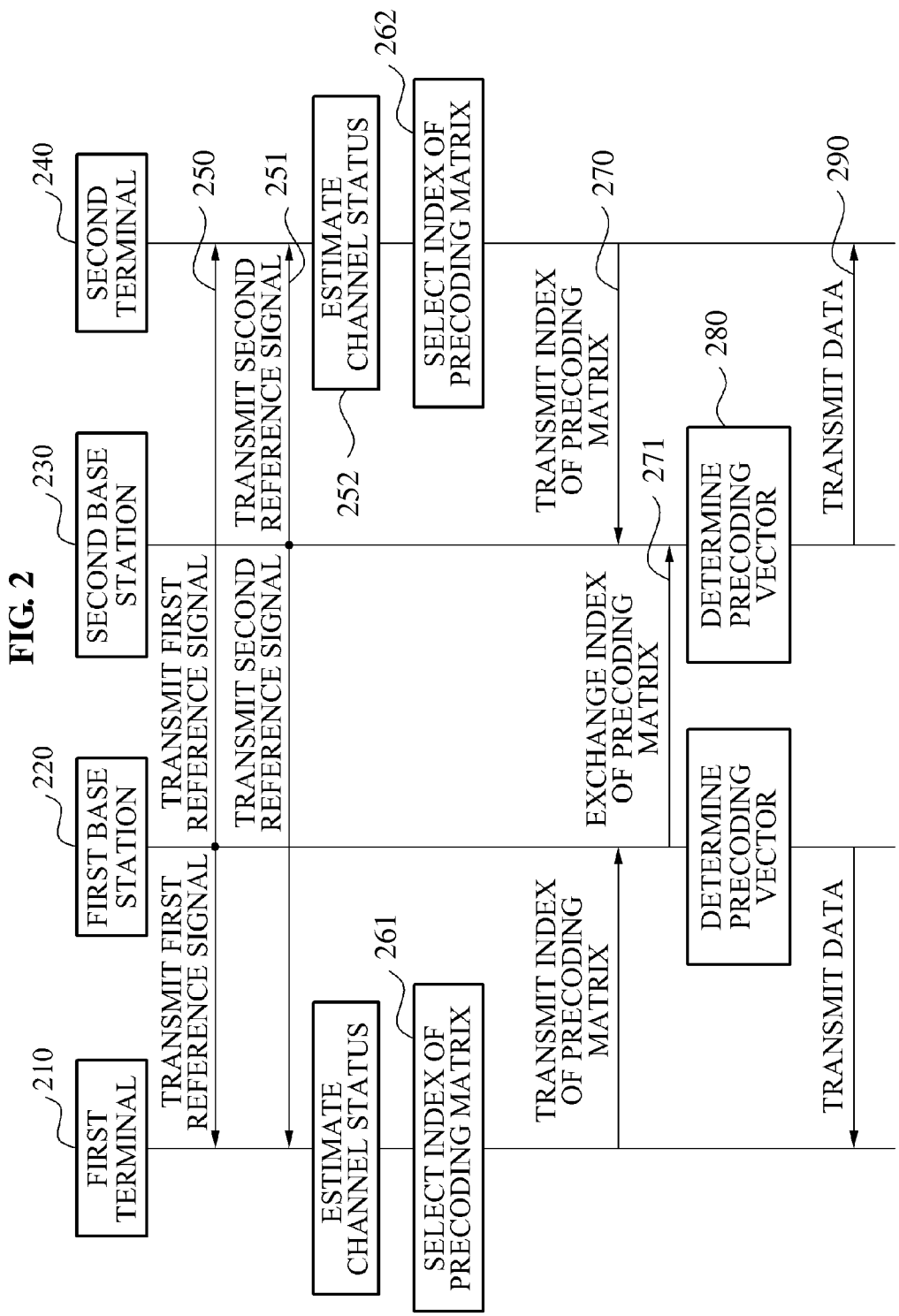
FIG. 2 is a flowchart illustrating an example of a data transmission process.

FIG. 2 illustrates an example of a data transmission process.

In operation 250, a first base station 220 transmits a first reference signal to a first terminal 210 and a second terminal 240. The first reference signal may include a pattern that is known to the first terminal 210 and/or the second terminal 240.

In operation 251, a second base station 230 transmits a second reference signal to the first terminal 210 and the second terminal 240. The second reference signal may include a pattern that is known to the first terminal 210 and/or the second terminal 240.

In operation 252, the first terminal 210 estimates a status of a channel between the first base station 220 and the first terminal 210. Also, in this example, the second terminal 240 estimates a status of a channel between the second base station 230 and the second terminal 240. In this example, the channel between the first terminal 210 and the first base station 220, and the channel between the second terminal 240 and the second base station, are referred to as serving channels. In this example, the channel between the first terminal 210 and the second base station 230, and the channel between the second terminal 240 and the first base station 220, are referred to as interference channels.

In operation 261, the first terminal 210 selects an index of a precoding matrix based on a status of at least one of the serving channel and the interference channel. The first terminal 210 may select the index of the precoding matrix to increase the magnitude of data transmitted using the serving channel. The first terminal 210 may also select the index of the precoding matrix to increase the magnitude of data transmitted using the interference channel.

In operation 262, the second terminal 240 selects the index of the precoding matrix based on the status of at least one of the serving channel and the interference channel.

In operation 270, the first terminal 210 and the second terminal 240 transmit the selected index of the precoding matrix to the first base station 220 and the second base station 230, respectively. The transmitted index of the precoding matrix may be selected based on both the status of the serving channel and the status of the interference channel.

In operation 271, the first base station 220 and the second base station 230 exchange the index of the precoding matrix. In operation 270, the first base station 220 may be aware of only the index of the precoding matrix selected by the first terminal 210, and the second base station 230 may be aware of only the index of the precoding matrix selected by the second terminal 240. Accordingly, where the first base station 220 determines a precoding vector based on only the index of the precoding matrix transmitted from the first terminal 210, and the second base station 230 determines the precoding vector based on only the index of the precoding matrix transmitted from the second terminal 240, it may be difficult to maximize a data transmission performance of a data transmission system that includes at least the first base station 220 and the second base station 230.

In operation 271, the first base station 220 and the second base station 230 exchange the index of the precoding matrix. In operation 280, each of the first base station 220 and the second base station 230 determines an optimal precoding vector based on both the index of the precoding matrix selected by the first terminal 210 and the index of the precoding matrix selected by the second terminal 240. Each of the first base station 220 and the second base station 230 may determine the precoding vector to reduce the magnitude of data transmitted using the interference channel and/or to increase the magnitude of data transmitted using the serving channel.

In operation 290, the first base station 220 and the second base station 230 transmit data to the first terminal 210 and the second terminal 240, respectively, using the determined precoding vector. Because the precoding vector is determined based on both the interference channel and the serving channel in operation 280, the data transmission performance of the data transmission system may be increased.

Figure 3:
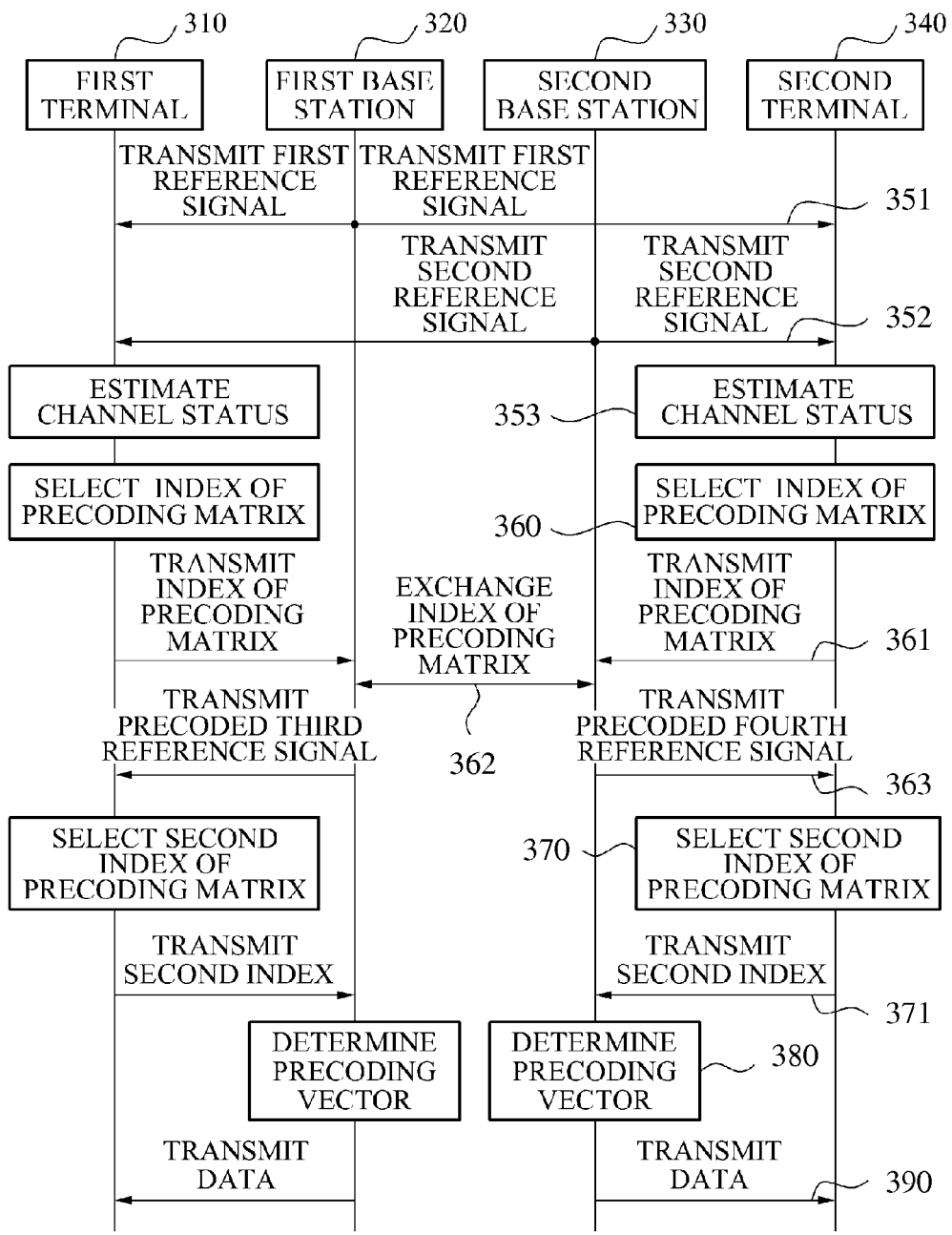
FIG. 3 is a flowchart illustrating another example of a data transmission process.

FIG. 3 illustrates another example of a data transmission process.

In operation 351, a first base station 320 transmits a first reference signal to a first terminal and a second terminal 340. In operation 352, a second base station 320 transmits a second reference signal to the first terminal 310 and the second terminal 340.

In operation 353, the first terminal 310 estimates a status of an interference channel between the first terminal 310 and the second base station 330 using the second reference signal. The second terminal 340 estimates a status of an interference channel between the first base station 320 and the second terminal 340.

In operation 360, each of the first terminal 310 and the second terminal 340 selects an index of a precoding matrix based on the estimated status of the interference channel. For example, in operation 360, a first index of a precoding matrix may be selected based on only the status of the interference channel. As another example, in operation 360, the first index of the precoding matrix may be selected based on only the serving channel, or based on both the serving channel and the interference channel.

In operation 361, the first terminal 310 and the second terminal 340 transmit the selected index of the precoding index to the first base station 320 and the second base station 330, respectively. The first base station 320 may receive an index of the precoding matrix that is selected based on the channel status between the first terminal 310 and the second base station 330. The second base station 330 may receive an index of the precoding matrix that is selected based on the channels status between the second terminal 340 and the first base station 320.

In operation 362, the first base station 320 and the second base station 330 exchange the indexes of the precoding matrix that they have received.

In operation 363, each of the first base station 320 and the second base station 330 precodes the reference signal based on the received index of the precoding matrix and the exchanged index of the precoding matrix. The first base station 320 transmits a precoded reference signal to the first terminal 310, and the second base station 330 transmits a precoded reference signal to the second terminal 340.

In operation 370, the first terminal 310 estimates a status of a serving channel between the first terminal 310 and the first base station 320, based on the precoded reference signal received from the first base station 320. The first terminal 310 selects an index of the precoding matrix based on the estimated status of the serving channel. The second terminal 340 estimates a status of a serving channel between the second terminal 340 and the second base station 330, based on the precoded reference signal received from the second base station 330. The second terminal 340 selects an index of the precoding matrix based on the estimated status of the serving channel.

In operation 371, the first terminal 310 transmits the index of the precoding matrix to the first base station 320, and the second terminal 340 transmits the index of the precoding matrix to the second base station 330.

In operation 380, each of the first base station 320 and the second base station 330 determines a precoding vector based on the received index of the precoding matrix. For example, the first base station 320 may determine, as the precoding matrix, a vector, from among a plurality of vectors. The vector is based on the index of the precoding matrix received from the first terminal 310. The second base station 330 may also determine, as a precoding matrix, a vector, from among a plurality of vectors.

In operation 390, the first base station 320 and the second base station 330 precode data using the precoding vector, and transmit the precoded data to the first terminal 310 and the second terminal 340, respectively.

Figure 4:
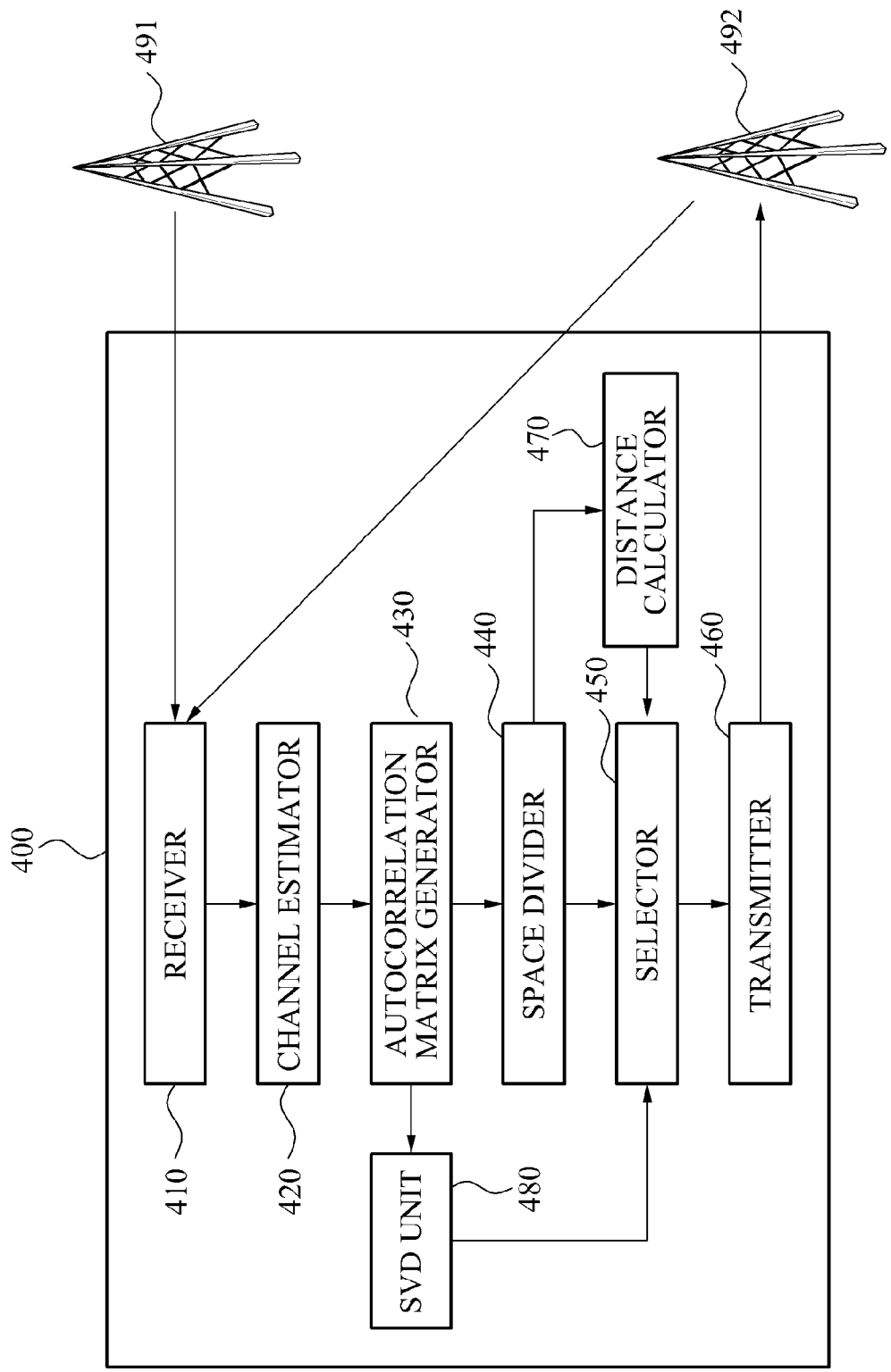
FIG. 4 is a diagram illustrating an example of a terminal device.

FIG. 4 illustrates an example of a terminal device.

A channel estimator 420 may estimate a status of an interference channel between the terminal 400 and an interference base station 491. In this example, the interference base station 491 denotes a base station that is adjacent to a serving base station 492 and transmits a signal to the terminal 400 that interferes with the signal transmitted from the serving base station 492. The channel estimator 420 may estimate a status of a channel between the terminal 400 and the serving base station 492.

A selector 450 may select an index of a precoding matrix based on the estimated status of the interference channel and the estimated status of the serving channel. The precoding matrix may include a plurality of vectors. The index of the precoding matrix may indicate a sequence of a particular vector among the vectors included in the precoding matrix.

A transmitter 460 may transmit the index of the precoding matrix to the serving base station 492.

A receiver 410 may receive data that is transmitted from the serving base station 492, based on the index of the precoding matrix. The serving base station 492 may determine a precoding vector based on the index of the precoding matrix, and may determine precode data using the precoding vector. The receiver 410 may receive the precoded data from the serving base station 492.

An autocorrelation matrix generator 430 may generate an autocorrelation matrix of the interference channel based on the status of the interference channel. In an example where the terminal includes a plurality of receive antennas (not shown), the interference channel may be in a form of a vector having the same number of elements as the number of receive antennas. The channel estimator 420 may estimate the interference channel to generate an interference channel vector. The autocorrelation matrix generator 430 may generate the autocorrelation matrix of the interference channel using the interference channel vector.

A space divider 440 may divide the autocorrelation matrix of the interference channel into a signal space and a null space. Each of the signal space and the null space may include a plurality of vectors. The vectors included in the signal space may be orthogonal to the vectors included in the null space.

The selector 450 may select a precoding candidate vector from the vectors included in the null space of the interference channel. The selector 450 may select an index of the precoding matrix from the vectors included in the precoding matrix. For example, the selector 450 may select an index of a vector similar to the precoding candidate vector.

By selecting a vector similar to a vector included in the null space, the interference from other terminals may be reduced.

A distance calculator 470 may calculate a distance between the precoding candidate vector and each of the vectors included in the precoding matrix. For example, if the distance is less than a reference distance, the selector 450 may determine that the two vectors are similar to each other. Accordingly, the selector 450 may select an index of the precoding matrix from among the plurality of vectors included in the precoding matrix. For example, the selector 450 may select an index of a vector having a shortest distance from the precoding candidate vector.

In an example where the terminal 400 includes a plurality of receive antennas, the serving channel may be in a form of a vector having the same number of elements as the number of receive antennas. The channel estimator 420 may estimate the status of the serving channel to generate a serving channel vector, and the autocorrelation matrix generator 430 may generate an autocorrelation matrix of the serving channel using the serving channel vector.

A singular value decomposition (SVD) unit 480 may perform an SVD for the autocorrelation matrix of the serving channel. By performing the SVD a number of matrices may be generated, for example, a left singular matrix, a singular value matrix, and a right singular matrix, with respect to the serving channel. The right singular matrix may include, for example, a right singular vector.

The selector 450 may select a precoding candidate vector from the vectors included in the null space of the interference channel. For example, the selector 450 may select a vector similar to the right singular vector of the serving channel. The selector 450 may also select a precoding matrix from the vectors included in the precoding matrix. For example, the selector 450 may select an index of a vector similar to the precoding candidate vector.

Figure 5:
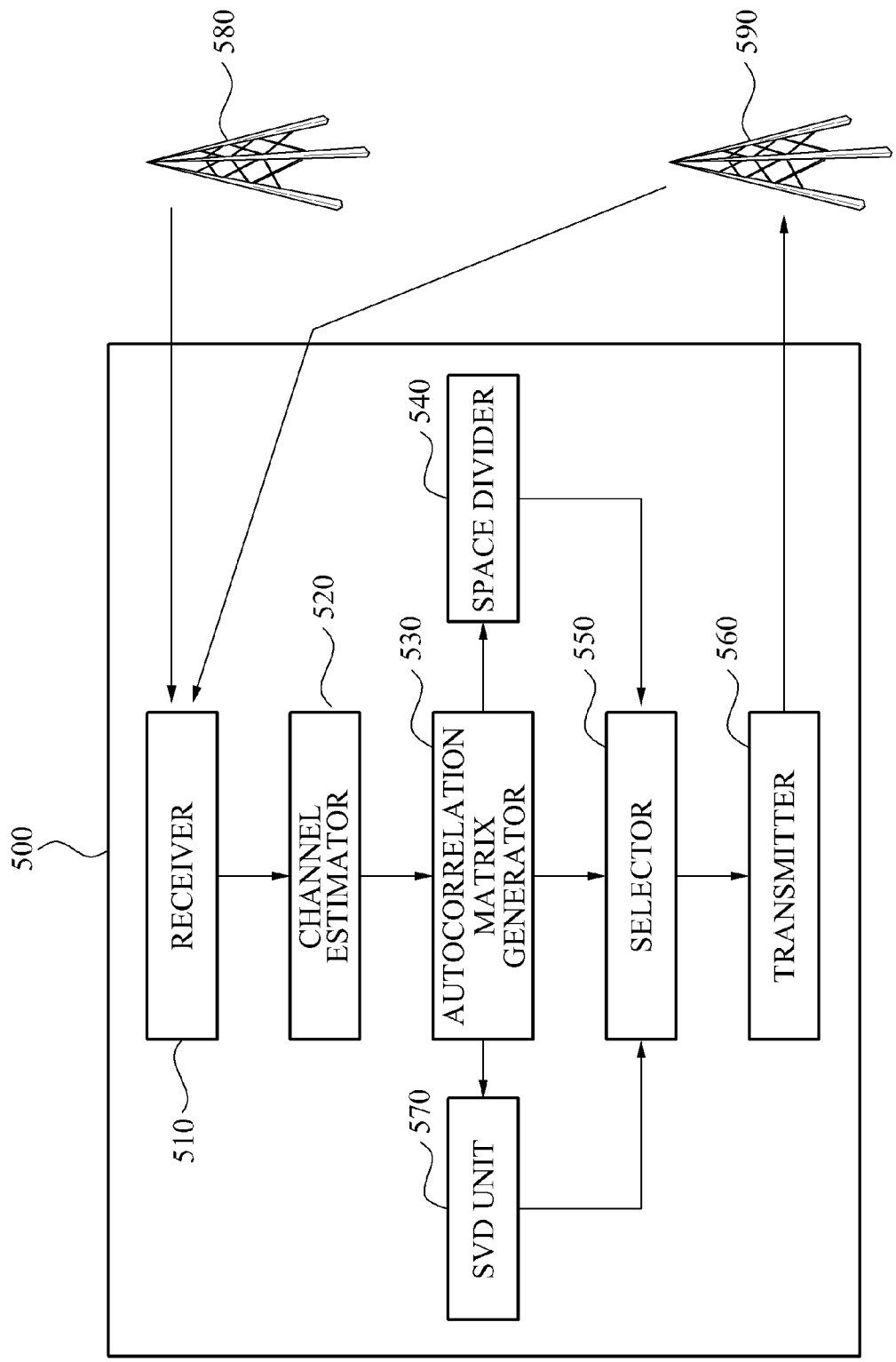
FIG. 5 is a diagram illustrating another example of a terminal device.

FIG. 5 illustrates another example of a terminal device. A channel estimator 520 may estimate a status of an interference channel between the terminal 500 and an interference base station 580. In this example, the interference base station 580 denotes a base station that is adjacent to a serving base station 590 and transmits a signal that interferes with the signal transmitted by the serving base station 590.

A selector 550 may select a first index of a precoding matrix based on the estimated status of the interference channel.

An autocorrelation matrix generator 530 may generate an autocorrelation matrix of the interference channel based on the status of the interference channel. A space divider 540 may divide the autocorrelation matrix of the interference channel into a signal space and a null space. The selector 550 may select a first precoding candidate vector from vectors included in the null space. The selector 550 may select a first index of the precoding matrix from vectors included in the precoding matrix. For example, the selector 550 may select an index of a vector similar to the first precoding candidate vector.

A transmitter 560 may transmit the first index of the precoding matrix to the serving base station 590. The serving base station 590 may precode a reference signal based on the first index of the precoding matrix, and transmit the precoded reference signal to the terminal 500.

A receiver 510 may receive the precoded reference signal from the serving base station 590. The channel estimator 520 may estimate a status of a serving channel between the terminal 500 and the serving base station 590, based on the reference signal. The selector 550 may select a second index of the precoding matrix based on the status of the serving channel.

The autocorrelation matrix generator 530 may generate an autocorrelation matrix of the serving channel based on the status of the serving channel.

An SVD unit 570 may perform an SVD for the autocorrelation matrix of the serving channel. The SVD unit 570 may generate a plurality of matrices, for example, a left singular matrix, a singular value matrix, and a right singular matrix, with respect to the serving channel. For example, the right singular matrix may include a right singular vector.

The selector 550 may select a second precoding candidate vector from vectors included in the null space of the interference channel. For example, the selector 550 may select a vector similar to the right singular vector of the serving channel. The selector 550 may select a second index of the precoding matrix from the vectors included in the precoding matrix. For example, the selector 550 may select an index of a vector having a shortest distance from the second precoding candidate vector.

The transmitter 560 may transmit the second index of the precoding matrix to the serving base station 590. The serving base station 560 may precode data based on the second index of the precoding matrix. The receiver 510 may receive the precoded data.

Figure 6:
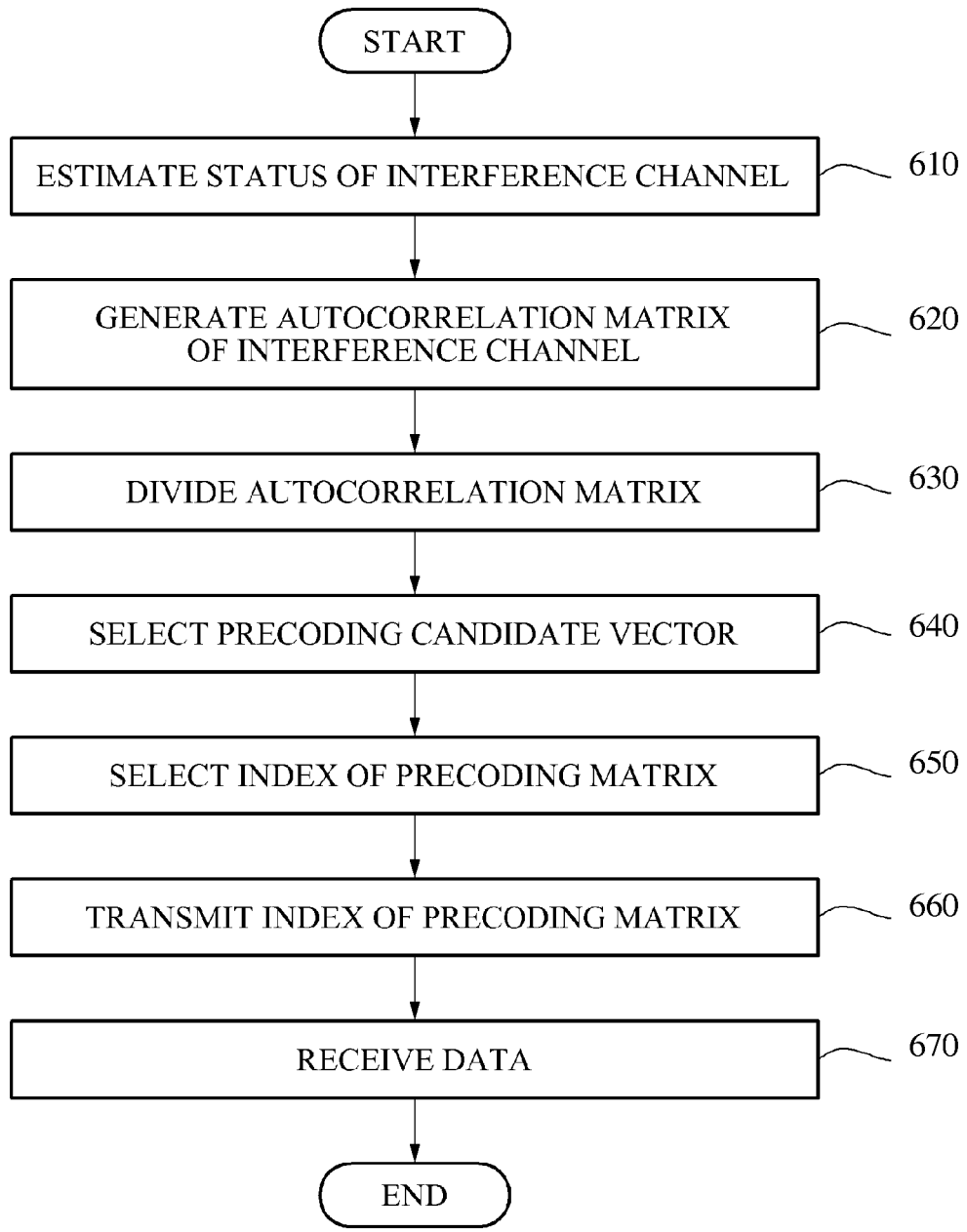
FIG. 6 is a flowchart illustrating an example of a method for receiving data.

FIG. 6 illustrates an example of a method for receiving data.

In operation 610, a terminal estimates a status of an interference channel between an interference base station and the terminal. The terminal may receive data from a serving base station. In this example, the interference base station denotes a base station that is adjacent to the serving base station. The interference base station transmits an interference signal to the terminal that interferes with the terminal receiving data from the serving base station.

In operation 620, the terminal generates an autocorrelation matrix of the interference channel. In the example where the terminal includes a plurality of receive antennas, the interference channel may be in a form of a vector having the same number of elements as the number of the receive antennas. The terminal may estimate the status of the interference channel to generate an interference channel vector, and may generate the autocorrelation matrix of the interference channel using the interference channel vector.

In operation 630, the terminal divides the autocorrelation matrix of the interference channel into a signal space and a null space. Vectors included in the signal space and vectors included in the null space may be orthogonal to each other.

In operation 640, the terminal selects a precoding candidate vector from the vectors included in the null space of the interference channel.

In operation 650, the terminal selects an index of a precoding matrix based on the status of the interference channel. For example, the terminal may select, as the index of the precoding matrix, an index of a vector similar to the precoding candidate vector from vectors included in the precoding matrix.

In operation 660, the terminal transmits the index of the precoding matrix to the serving base station.

In operation 670, the terminal receives data that is transmitted based on the index of the precoding matrix. The serving base station may determine a precoding vector based on the index of the precoding matrix. The serving base station may precode the data using the precoding vector and transmit the precoded data. The terminal may receive the precoded data.

Figure 7:
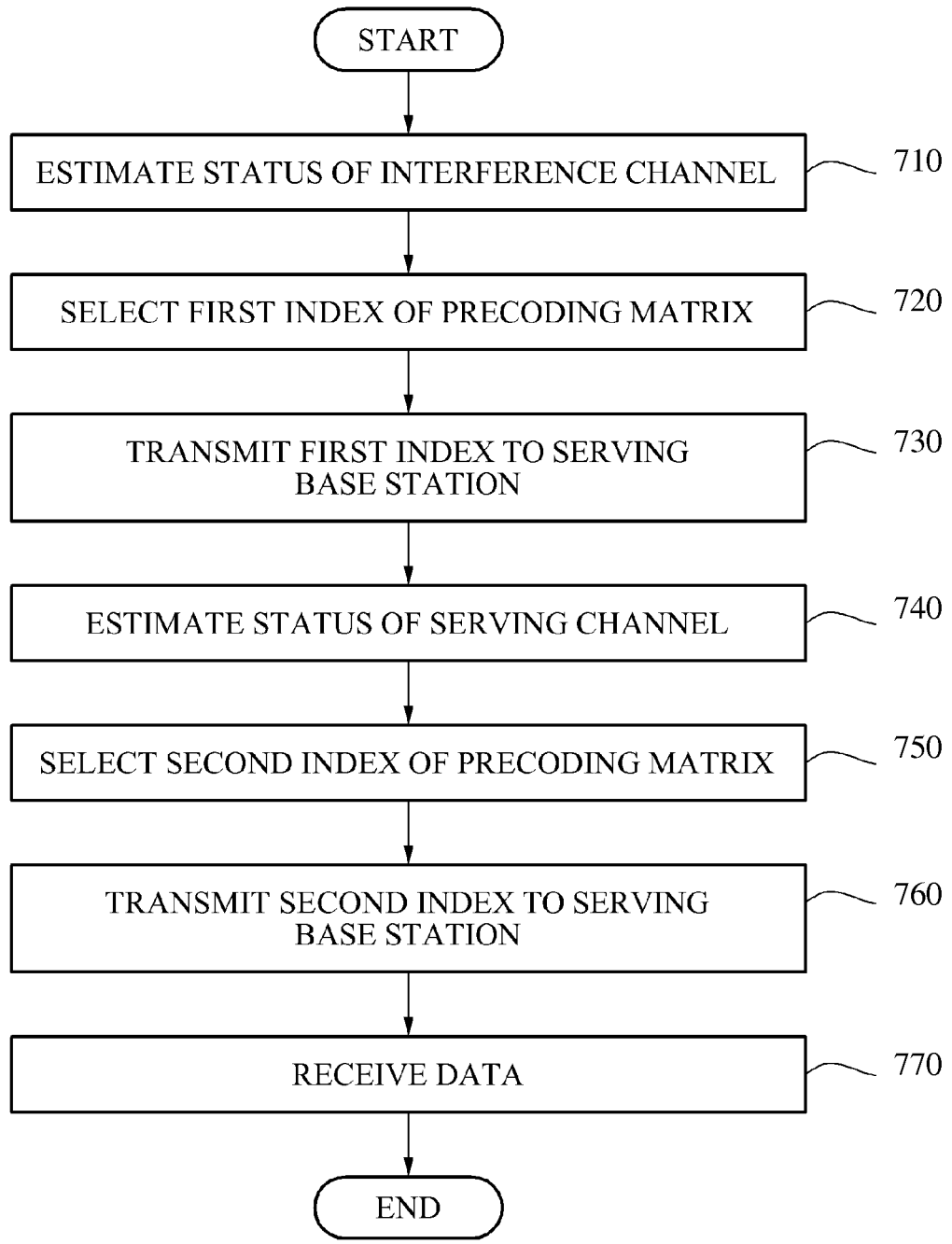
FIG. 7 is a flowchart illustrating another example of a method for receiving data.

FIG. 7 illustrates another example of a method for receiving data.

In operation 710, a terminal estimates a status of an interference channel. The interference channel denotes a channel between an interference base station and the terminal. The interference base station may transmit an interference signal to the terminal using the interference channel. The terminal may receive data from a serving base station. The interference signal may interfere with the terminal receiving data from the serving base station.

In operation 720, the terminal selects a first index of a precoding matrix based on the status of the interference channel.

In operation 730, the terminal transmits the first index of the precoding matrix to the serving base station. The serving base station may determine a first precoding vector based on the first index of the precoding matrix, and may precode a reference signal using the determined first precoding vector. The serving base station may transmit the precoded reference signal to the terminal.

In operation 740, the terminal estimates a status of a serving channel between the terminal and the serving base station using the precoded reference signal.

In operation 750, the terminal selects a second index of the precoding matrix based on the status of the serving channel. For example, the terminal may select the second index of the precoding matrix based on the status of the serving channel and the first index of the precoding matrix.

In various embodiments, operation 750 may further include generating an autocorrelation matrix of the serving channel based on the status of the serving channel. For example, where the terminal includes a plurality of receive antennas, the serving channel may be in a form of a vector having the same number of elements as the number of the receive antennas. The terminal may estimate the status of the serving channel to generate a serving channel vector, and may generate the autocorrelation matrix of the serving channel using the serving channel vector.

In various embodiments, operation 750 may further include performing an SVD for the autocorrelation matrix of the serving channel. The terminal may generate a plurality of matrices, for example, a left singular matrix, a singular value matrix, and a right singular matrix, with respect to the autocorrelation matrix of the serving channel. Operation 750 may further include dividing an autocorrelation matrix of the interference channel into a signal space and a null space.

Operation 750 may further include selecting a precoding candidate vector. For example, the terminal may select, as the precoding candidate vector, a vector similar to the right singular vector of the serving channel from vectors included in the null space of the interference channel.

In operation 760, the terminal transmits a second index of the precoding matrix to the serving base station. The serving base station may determine a second precoding vector based on the second index of the precoding matrix, and precode data using the determined second precoding matrix. The serving base station may transmit the precoded data to the terminal.

The terminal may select, as the second index of the precoding matrix, an index of a vector similar to the precoding candidate vector from vectors included in the precoding matrix.

In operation 770, the terminal receives the precoded data from the serving base station.

According to various embodiments, a base station may determine an index type and a terminal may feed back an index of a precoding matrix corresponding to the determined index type. Listed below are examples of index types.

1) In some embodiments, the terminal does not feed back the index of the precoding matrix to the base station. That is, the base station may determine a precoding vector without feedback from the terminal. The base station may signal the terminal to not send feedback information. For example, the base station may set the value of the "precoding matrix index feedback type information" to "00", and transmit the determined "precoding matrix index feedback type information" to the terminal. Upon receipt of "precoding matrix index feedback type information" of "00", the terminal may determine not to feed back the index of the precoding matrix to the terminal.

2) In some embodiments, the index of the precoding matrix fed back from the terminal to the base station may increase a signal-to-interference and noise ratio (SINR) of data received at the terminal. For example, the base station may set the value of the "precoding matrix index feedback type information" to "01", and transmit the determined "precoding matrix index feedback type information" to the terminal. Upon receipt of "precoding matrix index feedback type information" of "01", the terminal may select, as the index of the precoding matrix, an index of a vector that increases the SINR of the received data from vectors included in the precoding matrix, and may feed back the selected index of the precoding matrix to the base station.

3) In some embodiments, the index of the precoding matrix fed back from the terminal to the base station may minimize the effect of an interference channel. For example, the base station may set the value of the "precoding matrix index feedback type information" to "10", and transmit the determined "precoding matrix index feedback type information" to the terminal. Upon receipt of "precoding matrix index feedback type information" of "10", the terminal may select, as the index of the precoding matrix, an index of a vector that reduces the SINR of the received data from vectors included in the precoding matrix, and may feed back the selected index of the precoding matrix to the base station.

4) In some embodiments, the terminal may feed back the index of the precoding matrix to a plurality of base stations. The terminal may feed back the index of the precoding matrix to an interference base station as well as a serving base station. For example, the base station may set the value of the "precoding matrix index feedback type information" to "11", and transmit the determined "precoding matrix index feedback type information" to the terminal. Upon receipt of "precoding matrix index feedback type information" of "11", the terminal may feed back the precoding matrix to the serving base station and the interference base station.

Figure 8:
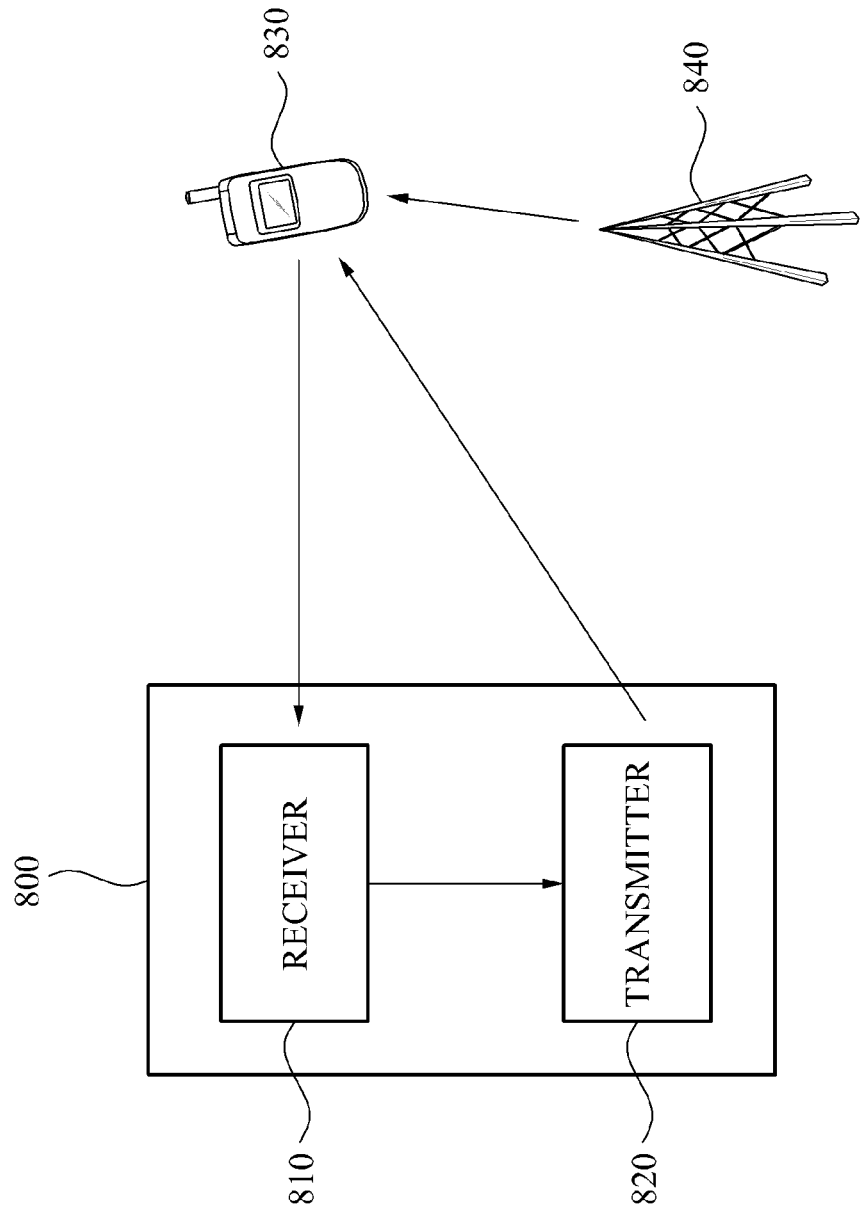
FIG. 8 is a diagram illustrating an example of a base station.

FIG. 8 illustrates an example of a base station.

Referring to the example shown in FIG. 8, base station 800 includes a receiver 810 and a transmitter 820. In some embodiments, the base station 800 may include a transceiver (not shown). The receiver 810 may receive an index of a precoding matrix from a terminal 830. The received index of the precoding matrix may be selected based on a status of a serving channel between the terminal 830 and the base station 800 that corresponds to a serving base station, and a status of an interference channel between an interference base station 840 and the terminal 830.

The terminal 830 may select the index of the precoding matrix using an autocorrelation matrix of the interference channel. For example, the terminal 830 may divide the autocorrelation matrix of the interference channel into a signal space and a null space, and select a precoding candidate vector from vectors included in the null space. The terminal 830 may select, as the index of the precoding matrix, an index of a vector similar to the precoding candidate vector, from vectors included in the precoding matrix.

The terminal 830 may select the index of the precoding matrix using an autocorrelation matrix of the serving channel. The terminal 830 may perform an SVD for the autocorrelation matrix of the serving channel to generate a plurality of matrices, for example, a left singular matrix, a singular value matrix, and a right singular matrix, with respect to the serving channel. The right singular matrix may include a right singular vector. The terminal 830 may select, as the precoding candidate vector, a vector similar to the right singular value. A transmitter 820 may transmit data to the terminal 830.

Figure 9:
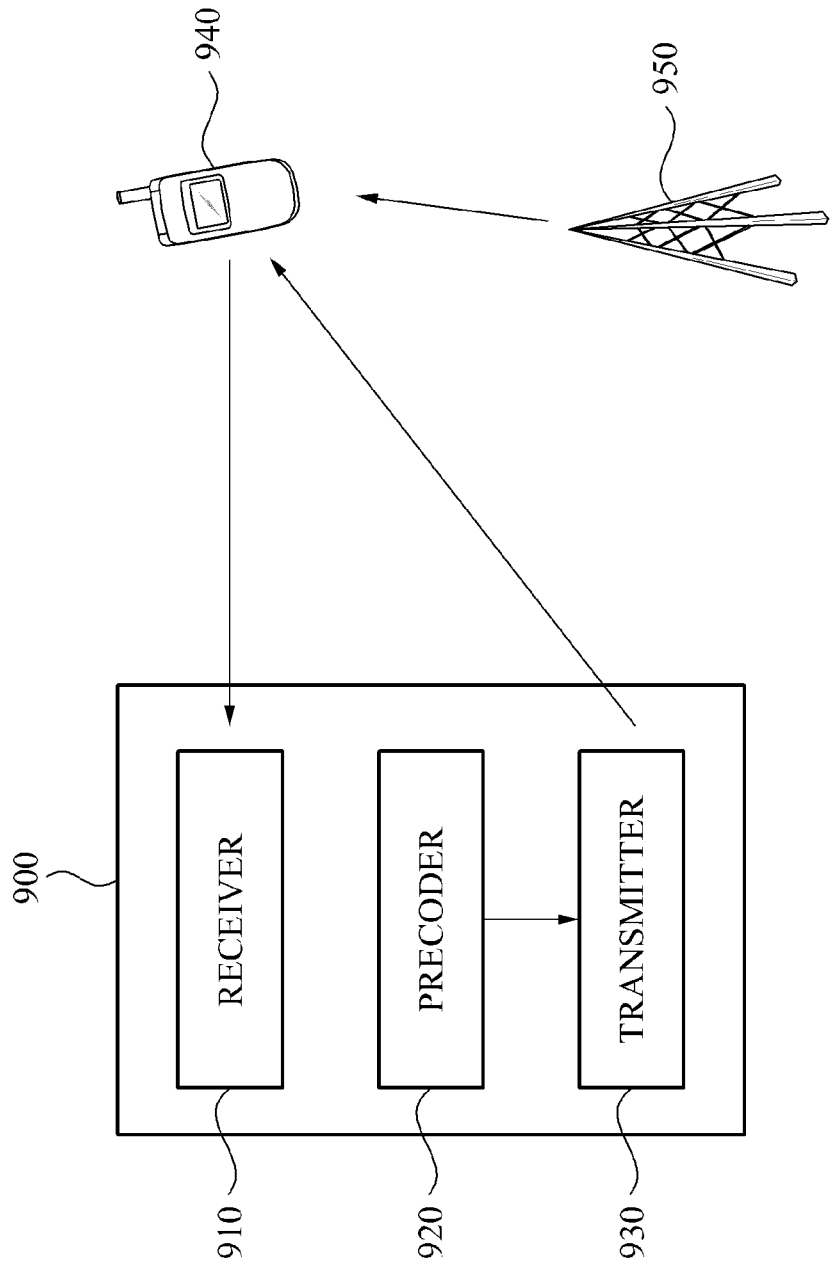
FIG. 9 is a diagram illustrating another example of a base station.

FIG. 9 illustrates another example of a base station.

Base station 900 includes a receiver 910, a precoder 920, and a transmitter 930. The receiver 910 may receive, from a terminal 940, a first index of a precoding matrix that is selected based on a status of an interference channel between the terminal 940 and an interference base station 950.

The terminal 940 may select the first index of the precoding matrix using an autocorrelation matrix of the interference channel. For example, the terminal 940 may divide the autocorrelation matrix of the interference channel into a signal space and a null space. The terminal 940 may select a first precoding candidate vector from vectors included in the null space. The first index of the precoding matrix may correspond to an index of a vector similar to the first precoding candidate vector from vectors included in the precoding matrix.

The precoder 920 may precode a reference signal based on the first index of the precoding matrix. The precoder 920 may precode a reference signal using a vector corresponding to the first index of the precoding matrix among the vectors included in the precoding matrix.

The transmitter 930 may transmit the precoded reference signal to the terminal 940. The terminal 940 may estimate a status of a serving channel between the terminal 940 and the base station 900 that corresponds to a serving base station, based on the precoded reference signal. The terminal 940 may select a second index of the precoding matrix based on the status of the serving channel. For example, the terminal 940 may select the second index of the precoding matrix by performing an SVD for an autocorrelation matrix of the serving channel.

The receiver 910 may receive the second index of the precoding matrix that is selected based on the reference signal. The precoder 920 may precode data based on the second index of the precoding matrix. The transmitter 930 may transmit the precoded data to the terminal 940.

As described herein, where the terminal includes a plurality of receive antennas, the interference channel may be in a form of a vector having the same number of elements as the number of the receive antennas. It should be understood that the vector may have a lesser number of elements in comparison to the number of receive antennas, or the vector may have a greater number of elements in comparison to the number of receive antennas.

As described herein, where the terminal includes a plurality of receive antennas, the serving channel may be in a form of a vector having the same number of elements as a number of the receive antennas. It should be understood that the vector may have a lesser number of elements in comparison to the number of receive antennas, or the vector may have a greater number of elements in comparison to the number of receive antennas.

The phrase "adjacent base station," as described herein, should be understood to refer to a base station positioned within range of a terminal. For example, an adjacent base station that interferes with a terminal receiving data from a serving base station, is positioned near enough to the terminal such that signal transmitted from the adjacent base station may interfere with the data being received by the terminal.

The above-described processes, functions, methods and/or software may be recorded, stored, or fixed in one or more computer-readable storage media that includes program instructions to be implemented by a computer to cause a processor to execute or perform the program instructions. The media may also include, alone or in combination with the to program instructions, data files, data structures, and the like. The media and program instructions may be those specially designed and constructed, or they may be of the kind well-known and available to those having skill in the computer software arts. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, a terminal or terminal device described herein may refer to mobile devices such as a cellular phone, a personal digital assistant (PDA), a digital camera, a portable game console, and an MP3 player, a portable/personal multimedia player (PMP), a handheld e-book, a portable lab-top personal computer (PC), a global positioning system (GPS) navigation, and devices such as a desktop PC, a high definition television (HDTV), an optical disc player, a setup box, and the like capable of wireless communication or communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A terminal, comprising:
a channel estimator configured to estimate the status of an interference channel between the terminal and an interference base station and to estimate the status of a serving channel between the terminal and a serving base station;
a selector configured to select an index of a precoding matrix based on the status of the interference channel and the status of the serving channel;
a transmitter configured to transmit the selected index of the precoding matrix to the serving base station;
a receiver configured to receive data from the serving base station based on the index of the precoding matrix;
an autocorrelation matrix generator configured to generate an autocorrelation matrix of the interference channel based on the status of the interference channel; and
a space divider configured to divide the autocorrelation matrix of the interference channel into a signal space and a null space,
wherein the selector is further configured to select a precoding candidate vector from among vectors included in the null space, and
wherein the selector is further configured to select, as the index of the precoding matrix, an index of a vector that is most similar to the precoding candidate vector, from among vectors included in the precoding matrix.

2. The terminal of claim 1, further comprising:
a singular value decomposer configured to perform a singular value decomposition (SVD) for the serving channel,
wherein the selector is further configured to select, as the precoding candidate vector, a vector that is most similar to a right singular vector of the serving channel, from among the vectors included in the null space.

3. The terminal of claim 1, further comprising:
a distance calculator configured to calculate a distance between the precoding candidate vector and each of the vectors included in the precoding vector,
wherein the selector is further configured to select an index of a vector having the shortest distance from the precoding candidate vector, as the index of the precoding index.

4. The terminal of claim 1, wherein the selected index of the precoding matrix identifies the magnitude of the transmission signals to be transmitted by the serving base station on the serving channel.

5. A base station, comprising:
a receiver configured to receive, from a terminal, an index of a precoding matrix that is selected based on the status of a serving channel between the terminal and a serving base station and the status of an interference channel between the terminal and an interference base station; and
a transmitter configured to transmit data to the terminal using a vector corresponding to the index of the precoding matrix, from among vectors included in the precoding matrix,
wherein the index of the precoding matrix corresponds to an index of a vector that is most similar to a precoding candidate vector that is included in a null space of an autocorrelation matrix of the interference channel, from among the vectors included in the precoding matrix.

6. The base station of claim 5, wherein the precoding candidate vector corresponds to a vector that is most similar to a right singular vector of the autocorrelation matrix of the serving channel, from among the vectors included in the precoding matrix.

7. A terminal, comprising:
a channel estimator configured to estimate the status of an interference channel between the terminal and an interference base station;
a selector configured to select a first index of a precoding matrix based on the status of the interference channel;
a transmitter configured to transmit the selected first index of the precoding matrix to a serving base station; and
a receiver configured to receive, from the serving base station, a reference signal that is precoded based on the first index of the precoding matrix,
wherein the channel estimator is further configured to estimate the status of a serving channel between the terminal and the serving base station based on the reference signal,
wherein the selector is further configured to select a second index of the precoding matrix based on the status of the serving channel,
wherein the transmitter is further configured to transmit the selected second index of the precoding matrix to the serving base station, and
wherein the receiver is further configured to receive data that is precoded based on the first index and the second index of the precoding matrix;
an autocorrelation matrix generator configured to generate an autocorrelation matrix of the interference channel based on the status of the interference channel; and
a space divider configured to divide the autocorrelation matrix of the interference channel into a signal space and a null space,
wherein the selector is further configured to select a first precoding candidate vector from vectors included in the null space, and
wherein the selector is further configured to select, as an index of the precoding matrix, an index of a vector that is most similar to the first precoding candidate vector, from among vectors included in the precoding matrix.

8. The terminal of claim 7, further comprising:
a singular value decomposer configured to perform a SVD for the serving channel,
wherein the selector is further configured to select, as a second precoding candidate vector, a vector that is most similar to a right singular vector of the serving channel, from among the vectors included in the null space of the interference channel, and wherein the selector is further configured to select, as the second index of the precoding matrix, an index of a vector having a shortest distance from the second precoding candidate vector, from among the vectors included in the precoding matrix.

9. A base station, comprising:
a receiver configured to receive, from a terminal, a first index of a precoding matrix that is selected based on the status of an interference channel between the terminal and an interference base station;
a precoder configured to precode a reference signal based on the received first index of the precoding matrix; and
a transmitter configured to transmit the precoded reference signal to the terminal,
wherein the receiver is further configured to receive a second index of the precoding matrix that is selected based on the reference signal,
wherein the precoder is further configured to precode data based on the first index and the second index of the precoding matrix, and
wherein the transmitter is further configured to transmit the precoded data to the terminal, and
wherein the first index of the precoding matrix corresponds to an index of a vector that is most similar to a precoding candidate vector included in a null space of an autocorrelation matrix of the interference channel, from among vectors included in the precoding matrix.

10. The base station of claim 9, wherein the second index of the precoding matrix is selected based on a SVD performed for a serving channel between the terminal and a serving base station.

11. A method of receiving data at a terminal, the method comprising:
estimating the status of an interference channel between a terminal and an interference base station and the status of a serving channel between the terminal and a serving base station;
selecting an index of a precoding matrix based on the status of the interference channel and the status of the serving channel;
transmitting the selected index of the precoding matrix to the serving base station;
receiving data from the serving base station based on the index of the precoding matrix;
generating an autocorrelation matrix of the interference channel based on the status of the interference channel;
dividing the autocorrelation matrix of the interference channel into a signal space and a null space; and
selecting a precoding candidate vector from among vectors included in the null space,
wherein the selecting of the index of the precoding matrix comprises selecting an index of a vector that is most similar to the precoding candidate vector, from among vectors included in the precoding matrix.

12. The method of claim 11, further comprising:
generating an autocorrelation matrix of the serving channel based on the status of the serving channel; and
performing a SVD with respect to the serving channel,
wherein the selecting of the precoding candidate vector comprises selecting a vector that is most similar to a right singular vector of the serving channel, from among vectors included in the null space.

13. A method of receiving data at a terminal, the method comprising:
estimating a status of an interference channel between the terminal and an interference base station;
selecting a first index of a precoding matrix based on the status of the interference channel;
transmitting the selected first index of the precoding matrix to a serving base station;
receiving, from the serving base station, a reference signal that is precoded based on the first index of the precoding matrix;
estimating a status of a serving channel between the terminal and the serving base station based on the reference signal;
selecting a second index of the precoding matrix based on the status of the serving channel;
transmitting the selected second index of the precoding matrix to the serving base station;
receiving data that is precoded based on the first index and the second index of the precoding matrix;
generating an autocorrelation matrix of the interference channel based on the status of the interference channel;
dividing the autocorrelation matrix of the interference channel into a signal space and a null space; and
selecting a first precoding candidate vector from among vectors included in the null space,
wherein the selecting of the first index of the precoding matrix comprises selecting an index of a vector that is most similar to the first precoding candidate vector, from among vectors included in the precoding matrix.

14. The method of claim 13, further comprising:
generating an autocorrelation matrix of the serving channel based on the status of the serving channel;
performing a SVD for the serving channel; and
selecting, as a second precoding candidate vector, a vector that is most similar to a right singular vector of the serving channel, from among the vectors included in the null space,
wherein the selecting of the second index of the precoding matrix comprises selecting an index of a vector having a shortest distance from the second precoding candidate vector, from among the vectors included in the precoding matrix.

15. The method of claim 14, further comprising:
calculating a distance between the second precoding candidate vector and each of the vectors included in the precoding matrix,
wherein the selecting of the second index of the precoding matrix comprises selecting the index of the vector having the shortest distance from the second precoding candidate vector, as the second index of the precoding matrix.

16. A non-transitory computer-readable storage medium embodied with instructions for causing a processor to implement a method, comprising:
estimating the status of an interference channel between a terminal and an interference base station and the status of a serving channel between the terminal and a serving base station;
selecting an index of a precoding matrix based on the status of the interference channel and the status of the serving channel;
transmitting the selected index of the precoding matrix to the serving base station;
receiving data from the serving base station based on the index of the precoding matrix;
generating an autocorrelation matrix of the interference channel based on the status of the interference channel;
dividing the autocorrelation matrix of the interference channel into a signal space and a null space; and selecting a precoding candidate vector from among vectors included in the null space, wherein the selecting of the index of the precoding matrix comprises selecting an index of a vector that is most similar to the precoding candidate vector, from among vectors included in the precoding matrix.

* * * * *